M. A. Shepard.

PAN LIFTER.

No. 74855.

Patented Feb 25 1868.

Attest.
James H. Layman

Inventor.
M. A. Shepard
By Knight Bros
Attys.

United States Patent Office.

MORRILL A. SHEPARD, OF BRIDGEPORT, ILLINOIS.

Letters Patent No. 74,855, dated February 25, 1868.

IMPROVED PAN-LIFTER.

The Schedule referred to in these Letters Patent and making part of the same.

TO ALL WHOM IT MAY CONCERN:

Be it known that I, MORRILL A. SHEPARD, of Bridgeport, Lawrence county, and State of Illinois, have invented a certain new and useful Pan-Lifter; and do hereby declare the following to be a full, clear, and exact description thereof, reference being had to the accompanying drawings, making part of this specification.

This invention relates to a cheap, simple, and effective implement for removing hot pans, plates, and similar cooking-utensils, from a stove or oven. In the accompanying drawings—

Figure 1:
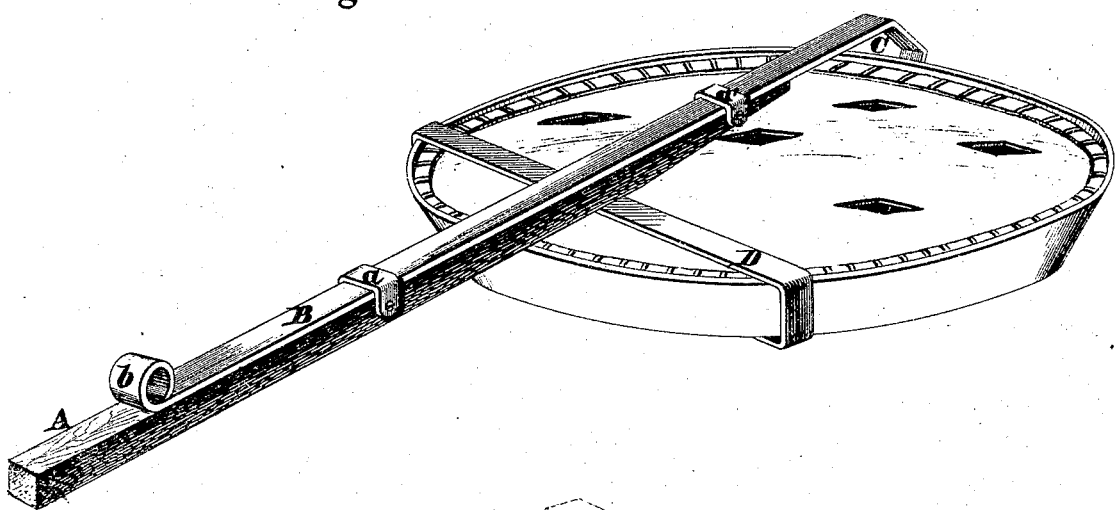
Figure 2:
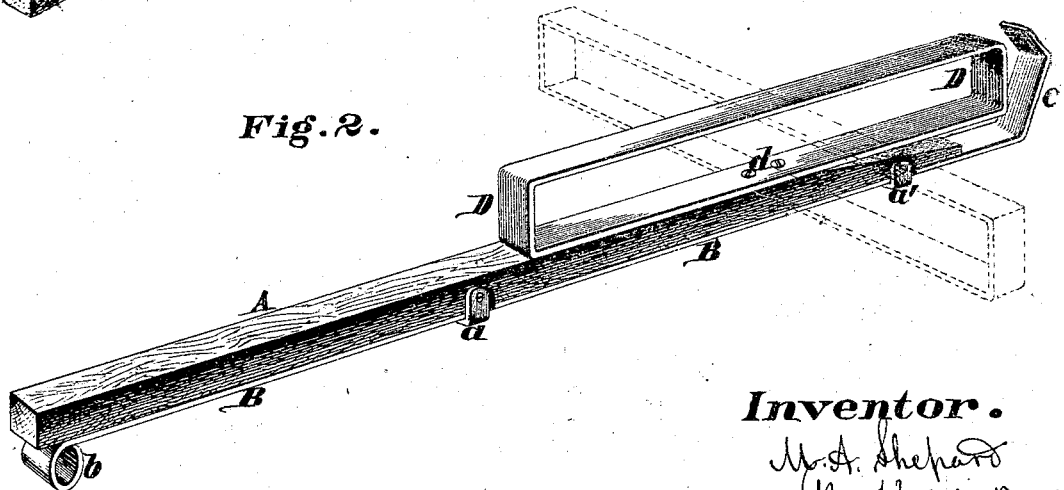

Figure 1 is a perspective view of a pan-lifter embodying my invention, the lifter being shown in its condition for use; and Figure 2 is a perspective view of the same in its closed position for transportation.

A represents a wooden or other suitable handle, and this handle is provided with a rod, B, which is confined to a longitudinal path along said handle by means of the staples $a\ a'$. One end of the rod B is provided with a swell, $b$, which serves as a handle, and the other end of said rod terminates in a hooked portion, C, for the purpose of engaging over the edge of the plate or pan. Pivoted at $d$, to the under side of the handle A, is a sheet-metal loop or holder, D, whose length should be somewhat less than the diameter of the plate or other utensil to be lifted. This loop or holder in its effective condition should stand at right angles to the handle, as shown in fig. 1, but when the articles are to be packed for transportation, it should be swung around, so as to be parallel with the handle, as represented in fig. 2.

Before being packed, a second-screw may be passed through the loop D, so as to prevent any accidental displacement of said loop or holder, and, if preferred, when in use, the holder may be permanently attached. Instead of making the bar B and loop D out of metallic strips, they may be formed of stout wire.

To remove a pan or plate from the stove or oven, the hooked bar B is first shoved out to its full length, and the lifter is then held in such a position as to bring the loop D directly in front of the pan or plate. The bar B is now retracted by the operator, and, as soon as its hooked portion C comes in contact with the rear side of the pan, it shoves the latter forward, and causes it to slip into the loop D, in which condition the pan can be safely removed from the stove, and without any danger of burning the hands of the operator. The pan can be carried any distance in the lifter, and when it is desired to release it, the rod B is again shoved out, and the pan is at once deposited upon a table, or it can be placed directly within a cupboard or safe.

I claim herein as new, and of my invention—

A pan-lifter, consisting of the members A, $a\ a'$, B, C, and D, the whole being arranged and operating substantially as herein described and for the purpose set forth.

In testimony of which invention, I hereunto set my hand.

MORRILL A. SHEPARD.

Witnesses:
GEO. H. KNIGHT,
JAMES H. LAYMAN.